United States Patent [19]

Tsuruoka et al.

[11] Patent Number: 4,622,605
[45] Date of Patent: Nov. 11, 1986

[54] TAPE CASSETTE ADAPTER HAVING A MOTOR FOR DRIVING TAPE DRAW-OUT MEANS THEREOF TO FORM A PREDETERMINED TAPE PATH THEREIN

[75] Inventors: Mitsuharu Tsuruoka, Kodaira; Keiji Sasaki, Sagamihara, both of Japan

[73] Assignee: Victor Company of Japan, Ltd., Kanagawa, Japan

[21] Appl. No.: 617,346

[22] Filed: Jun. 5, 1984

[30] Foreign Application Priority Data

Jun. 16, 1983 [JP] Japan ............... 58-93062[U]

[51] Int. Cl.⁴ .............. G11B 5/008; G11B 15/00; G11B 17/00; G03B 1/04
[52] U.S. Cl. .................... 360/94; 360/93; 360/95; 242/199
[58] Field of Search ............ 360/94, 93, 132, 137, 360/95; 242/199

[56] References Cited

U.S. PATENT DOCUMENTS

| | | | |
|---|---|---|---|
| 3,632,894 | 1/1972 | Bretschneider | 360/94 |
| 3,644,684 | 2/1972 | Tsuyi | 360/94 |
| 4,037,053 | 7/1977 | Müeller | 360/94 |
| 4,067,051 | 1/1978 | Nakamura | 360/95 |
| 4,464,694 | 8/1984 | Kondo | 360/137 |
| 4,470,560 | 9/1984 | Yoneya et al. | 360/95 |

FOREIGN PATENT DOCUMENTS

| | | | |
|---|---|---|---|
| 0962767 | 2/1975 | Canada | 360/94 |
| 2462650 | 6/1974 | Fed. Rep. of Germany | 360/94 |
| 55-45172 | 3/1980 | Japan | 360/94 |
| 57-88578 | 6/1982 | Japan | 360/94 |
| 58-77077 | 5/1983 | Japan | 360/94 |
| 58-118071 | 7/1983 | Japan | 360/94 |
| 58-130477 | 8/1983 | Japan | 360/94 |
| 1470433 | 4/1977 | United Kingdom | 360/94 |

Primary Examiner—John H. Wolff
Assistant Examiner—Alfonso Garcia
Attorney, Agent, or Firm—Ladas & Parry

[57] ABSTRACT

An adapter for a miniature type tape cassette comprises an adapter case having an external form and size substantially the same as those of a standard type tape cassette, an accommodating part for accommodating the miniature type tape cassette, a tape draw-out mechanism for drawing a tape out of the miniature type tape cassette which is accommodated within the accommodating part, and for forming a tape path within the adapter case, an electrical circuit located within the adapter case, and terminals coupled to the electrical circuit within the adapter case and exposed at a surface of the adapter case. The terminals make contact with a contact of a standard type recording and/or reproducing apparatus when the adapter is inserted into the standard type recording and/or reproducing apparatus, so as to electrically couple the electrical circuit within the adapter case to an electrical circuit within the standard type recording and/or reproducing apparatus.

3 Claims, 11 Drawing Figures

TAPE CASSETTE ADAPTER HAVING A MOTOR FOR DRIVING TAPE DRAW-OUT MEANS THEREOF TO FORM A PREDETERMINED TAPE PATH THEREIN

BACKGROUND OF THE INVENTION

The present invention generally relates to adapters for miniature type tape cassettes, used with a standard type recording and/or reproducing apparatus in a state where the adapter accommodates a miniature type tape cassette which is smaller than a standard type tape cassette, and more particularly to an adapter which becomes electrically coupled to the standard type recording and/or reproducing apparatus when the adapter is loaded into the standard type recording and/or reproducing apparatus.

A tape cassette which is smaller than a standard type tape cassette, was previously proposed in a U.S. Pat. No. 4,432,510, in which the assignee is the same as the assignee of the present application. Further, an adapter for the miniature type tape cassette, which is used when loading the miniature type tape cassette into a standard type recording and/or reproducing apparatus, was previously proposed in a U.S. Patent application Ser. No. 340,105 filed Jan. 18, 1982 (now U.S. Pat. No. 4,477,850), in which the assignee is the same as the assignee of the present application. The adapter was designed to accommodate the miniature type tape cassette. When a tape loading operation was performed with respect to the miniature type tape cassette accommodated within the adapter, a predetermined tape path was formed at the front of the adapter. This predetermined tape path at the front of the adapter, corresponded to the tape path at the front of the standard type tape cassette. The adapter accommodating the miniature type tape cassette and having the predetermined tape path at the front thereof, was loaded into the standard type recording and/or reproducing apparatus as in the case of the standard type tape cassette.

In the adapter described above, a tape draw-out mechanism for drawing the tape out of the miniature type tape cassette which is accommodated within the adapter, was designed to be operated manually. For this reason, the adapter was not perfectly and conveniently designed for the user. Hence, a more conveniently designed adapter having a motor and a battery built therein was proposed. According to this motorized type adapter, the predetermined tape path was formed at the front of the adapter, automatically by the motor.

On the other hand, when the operator wanted to change the miniature type tape cassette which is being played on the conventional standard type recording and/or reproducing apparatus to another miniature type tape cassette, the adapter had to be once unloaded from the standard type recording and/or reproducing apparatus. Then, the miniature type tape cassette accommodated within the unloaded adapter was changed to the other miniature type tape cassette, and the adapter accommodating the other miniature type tape cassette was again loaded into the standard type recording and/or reproducing apparatus. Hence, especially when the miniature type tape cassette accommodated within the adapter had to be changed successively a plurality of times, it was necessary to repeat an operation in which the adapter is unloaded from the standard type recording and/or reproducing apparatus, the miniature type tape cassette accommodated within the unloaded adapter is changed to a different miniature type tape cassette by manually operating the tape draw-out mechanism twice, and the adapter accommodating the different miniature type tape cassette is again loaded into the standard type recording and/or reproducing apparatus. Therefore, there was a problem in that the miniature type tape cassette accommodated within the adapter could not be changed quickly, because the loaded adapter had to be once unloaded from the conventional standard type recording and/or reproducing apparatus and the tape draw-out mechanism had to be operated manually in order to change the miniature type tape cassette. As a result, the recording and/or reproduction was interrupted for a long period of time while the miniature type tape cassette was being changed.

Accordingly, a recording and/or reproducing apparatus was designed on the precondition that the adapters which will be loaded into this recording and/or reproducing apparatus are the motorized type adapter described before, in order to reduce the duration of the interruption of the recording and/or reproduction while the miniature type tape cassette was being changed. According to this recording and/or reproducing apparatus, the tape draw-out mechanism was operated by the motor while the adapter was unloaded from the loaded position to an eject position or loaded into the loaded position from the eject (or inserting) position, so as to eliminate the need to operate the tape draw-out mechanism outside the recording and/or reproducing apparatus.

The motorized type adapter is not electrically coupled to the above recording and/or reproducing apparatus even when the adapter is loaded into the recording and/or reproducing apparatus. Hence, it is impossible to supply an information related to the operating state within the adapter, from the adapter to the recording and/or reproducing apparatus, so that the recording and/or reproducing apparatus may operate responsive to this information. Further, the motor within the adapter is not coupled to a power source of the recording and/or reproducing apparatus, so that the motor within the adapter may be driven by the power source of the recording and/or reproducing apparatus. The battery within the adapter is therefore used to drive the motor within the adapter even when the adapter is loaded into the recording and/or reproducing apparatus. However, the capacity of the battery within the adapter is limited due to its size. Thus, there was a problem in that the serviceable life of the battery within the adapter was relatively short.

SUMMARY OF THE INVENTION

Accordingly, it is a general object of the present invention to provide a novel and useful adapter for a miniature type tape cassette, in which the problems described heretofore have been eliminated.

Another and more specific object of the present invention is to provide an adapter for a miniature type tape cassette, which is designed so that an electrical circuit within the adapter becomes electrically coupled to an electrical circuit of a standard type recording and/or reproducing apparatus when the adapter is loaded into the standard type recording and/or reproducing apparatus. According to the adapter of the present invention, an information related to the operating state within the adapter can be supplied to the standard type recording and/or reproducing apparatus, and the standard type recording and/or reproducing apparatus can be operated in a normal manner responsive to this information from the adapter.

Still another object of the present invention is to provide an adapter for a miniature type tape cassette, which is designed so that a motor driving circuit within the adapter becomes coupled to a power source supplying circuit of the standard type recording and/or reproducing apparatus when the adapter is loaded into the standard type recording and/or reproducing apparatus. According to the adapter of the present invention, a tape draw-out mechanism within the adapter is operated by a motor within the adapter, without the use of a battery within the adapter. As a result, the premature wear of the battery within the adapter can be reduced. The power source supplying circuit of the standard type recording and/or reproducing apparatus uses a commercial power source as its source of power, and there is no problem of premature wear. In addition, even when the battery within the adapter has worn out and died, the motor within the adapter will be driven in a normal manner when the adapter is loaded into the standard type recording and/or reproducing apparatus. Hence, a tape loading operation and a tape unloading operation within the adapter can be carried out in a normal manner when the adapter is loaded into the standard type recording and/or reproducing apparatus, even when the battery within the adapter has worn out and died.

A further object of the present invention is to provide an adapter for a miniature type tape cassette, which is designed so that the motor within the adapter becomes disconnected from the motor driving circuit within the adapter when the adapter is loaded into the standard type recording and/or reproducing apparatus. According to the adapter of the present invention, the battery within the adapter is prevented from becoming overcharged by a current from the standard type recording and/or reproducing apparatus.

Other objects and further features of the present invention will be apparent from the following detailed description when read in conjunction with the accompanying drawings.

DETAILED DESCRIPTION

Figure 1:
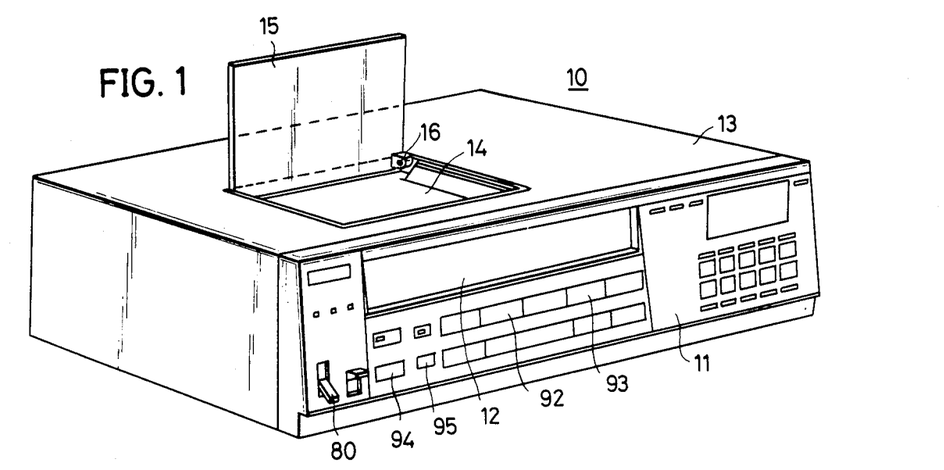
FIG. 1 is a perspective view showing an example of a magnetic recording and/or reproducing apparatus operable with an adapter for a miniature type tape cassette according to the present invention, in a state where a cover at an opening of the apparatus is open.
Figure 3:
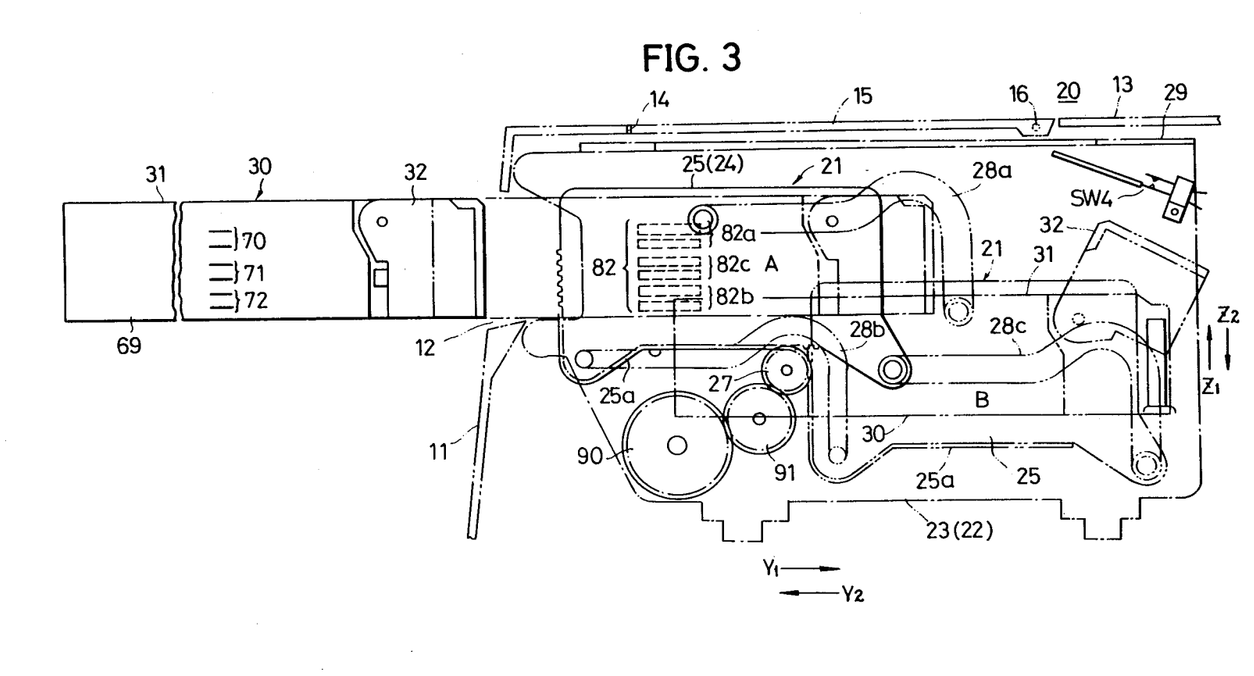

FIG. 1 shows an example of a magnetic recording and/or reproducing apparatus 10 which is operable with an adapter for a miniature type tape cassette according to the present invention. The apparatus 10 comprises a front panel 11 and a top plate 13. The front panel 11 has an inserting opening 12 through which an adapter (or a standard type tape cassette) is inserted, and the top plate 13 has an opening 14 through which a miniature type tape cassette may be removed and inserted. A cover 15 is pivotally supported by a pin 16 which is located at a rear thereof, and is designed to cover the opening 14. Normally, the cover 15 is closed as shown in FIG. 3. The cover 15 is opened when removing and inserting the miniature type tape cassette.

Figure 2:
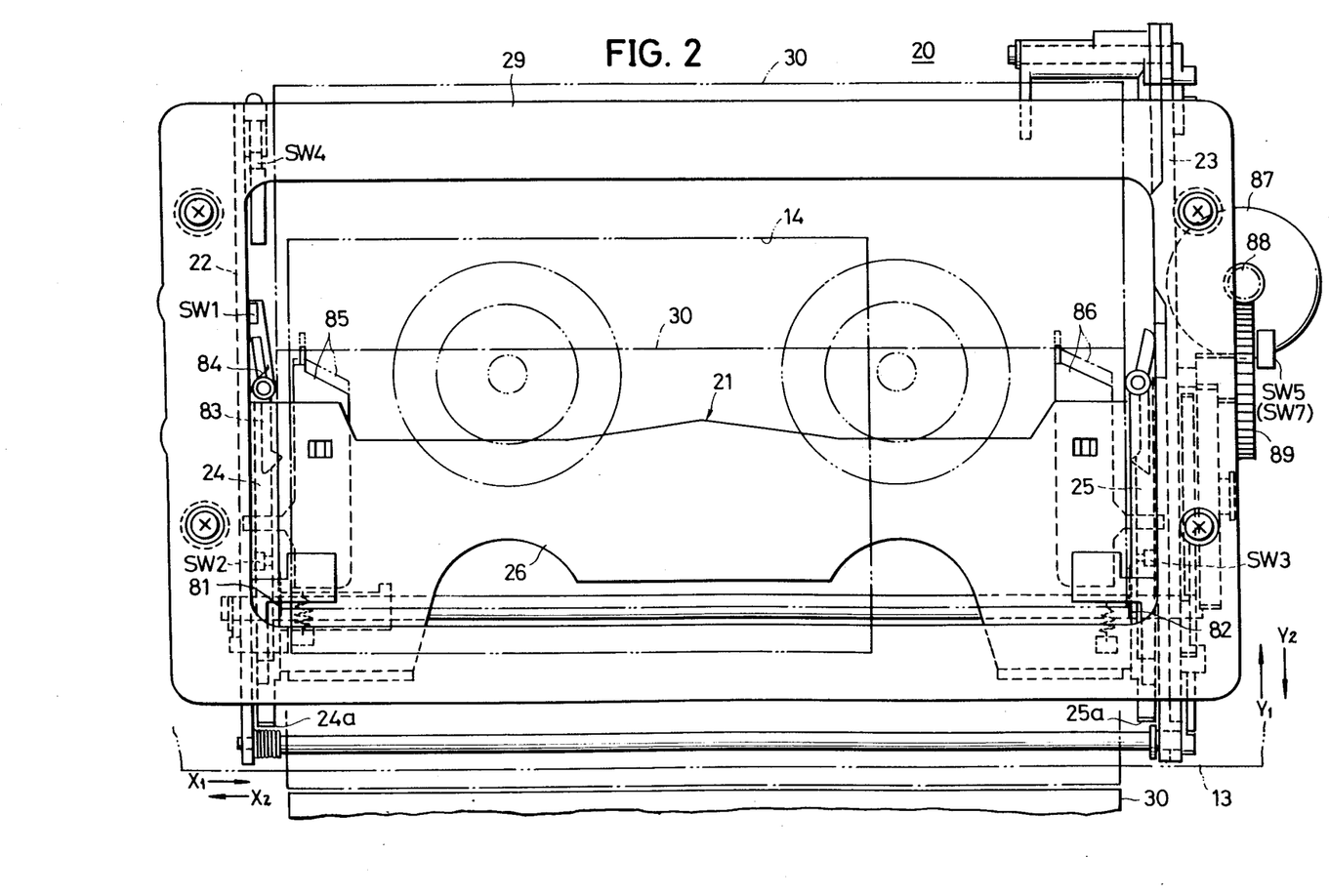
FIGS. 2 and 3 are a plan view and a side view, respectively showing an adapter loading and unloading mechanism assembled within the apparatus shown in FIG. 1, in correspondence with the adapter.

An automatic adapter (or tape cassette) loading and unloading mechanism 20 shown in FIGS. 2 and 3, is assembled within the apparatus 10. The loading and unloading mechanism 20 is substantially the same as the loading and unloading mechanism which was previously proposed in a U.S. Patent application Ser. No. 573,874 filed Jan. 25, 1984. The loading and unloading mechanism 20 generally comprises an adapter housing 21 which is movably disposed between right and left vertical support plates 23 and 22. The adapter housing 21 is a frame body made up of right and left side plates 25 and 24, and a bottom plate 26 connecting to the side plates 24 and 25. L-shaped rack gears 24a and 25a which are formed on the respective side plates 24 and 25, are driven by a pinion 27 (motor 87). Thus, the adapter housing 21 is guided by guide grooves 28a, 28b, and 28c of the vertical support plate 23 and corresponding guide grooves (not shown) of the vertical support plate 22, and moves between an adapter (tape cassette) inserting and extracting position A and an adapter (tape cassette) loading position B, through a miniature type tape cassette accommodating and removing position C shown in FIG. 10. The position C of the adapter housing 21 is detected by a switch SW4, and the adapter housing 21 is stopped at the position C according to the needs.

Figure 4:
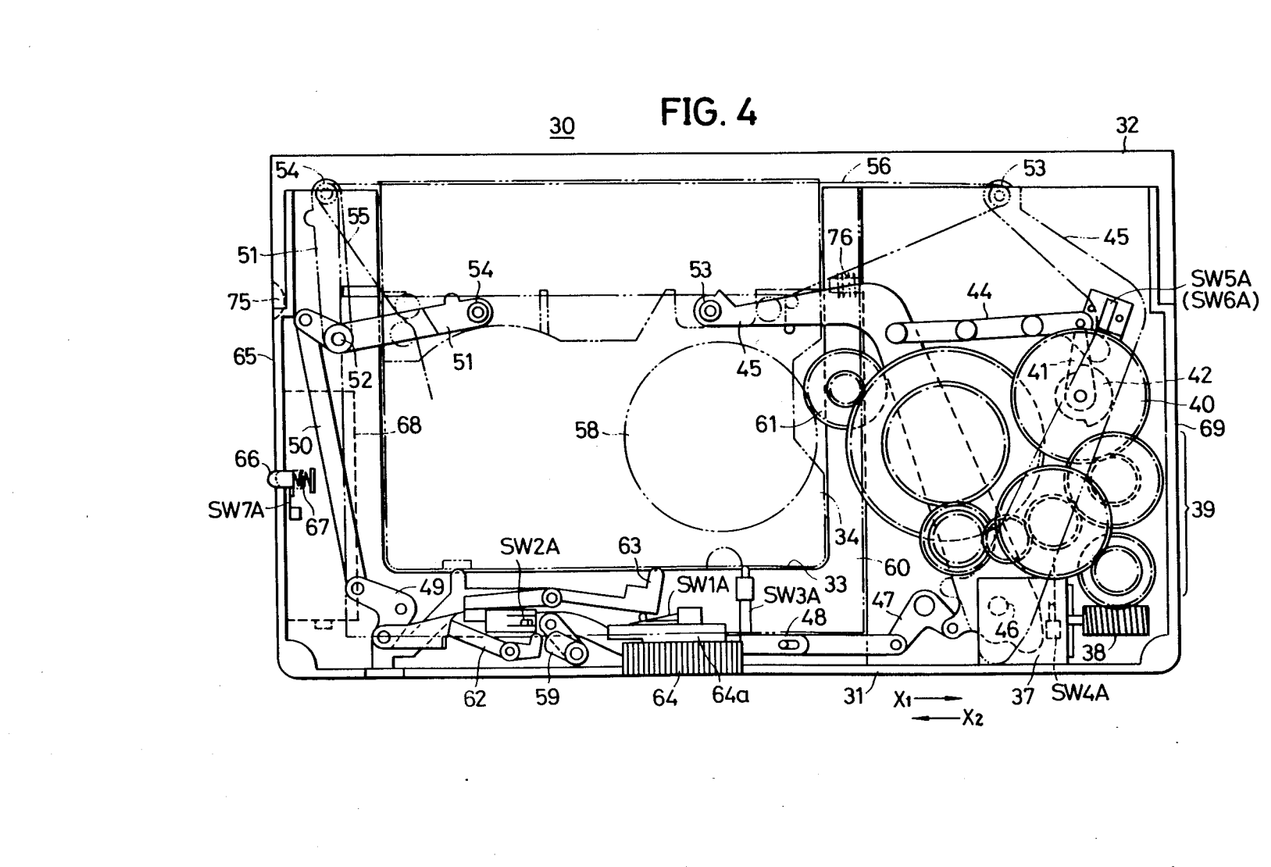
FIG. 4 is a plan view showing an embodiment of an adapter for a miniature type tape cassette according to the present invention, with an upper plate thereof removed.

The position C is selected so that a top cover 60 of an adapter 30 shown in FIG. 4 which is inserted within the adapter housing 21, opposes the opening 14 in the top plate 13 of the apparatus 10 at this position C. As will be described later on in the specification, the miniature type tape cassette within the adapter 30, is changed when the adapter housing 21 assumes the position C. A frame plate 29 which is open in the central part thereof, is mounted on tops of the vertical support plates 22 and 23.

Figure 11:
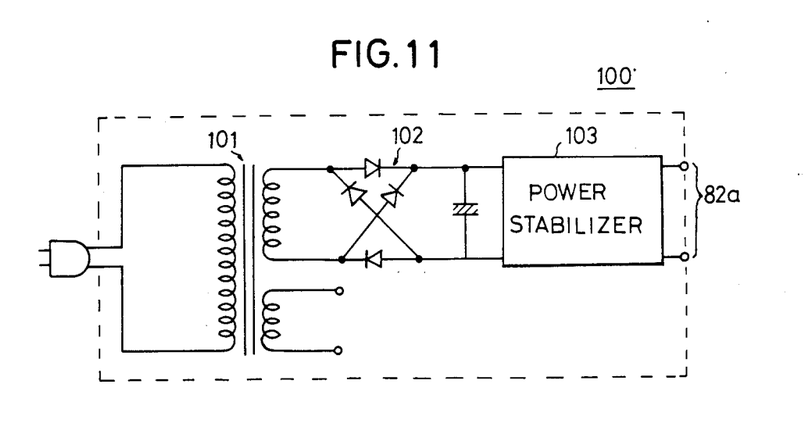
FIG. 11 is a circuit diagram showing an example of a power source supplying circuit within the apparatus shown in FIG. 1.

A control circuit (not shown) for controlling the operation of the loading and unloading mechanism 20 and a power source supplying circuit 100 shown in FIG. 11, are provided in the apparatus 10. The power source supplying circuit 100 comprises a transformer 101 which is applied with an A.C. commercial voltage, a rectifying circuit 102, and a power source circuit 103.

A predetermined voltage is produced through contacts 82a.

Figure 5:
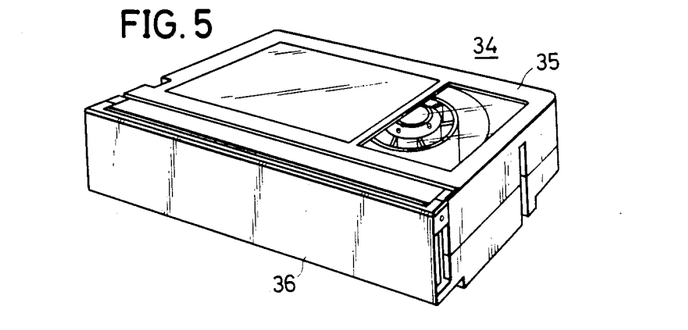
FIG. 5 is a perspective view showing an example of the miniature type tape cassette which is accommodated within the adapter shown in FIG. 4.
Figure 7:
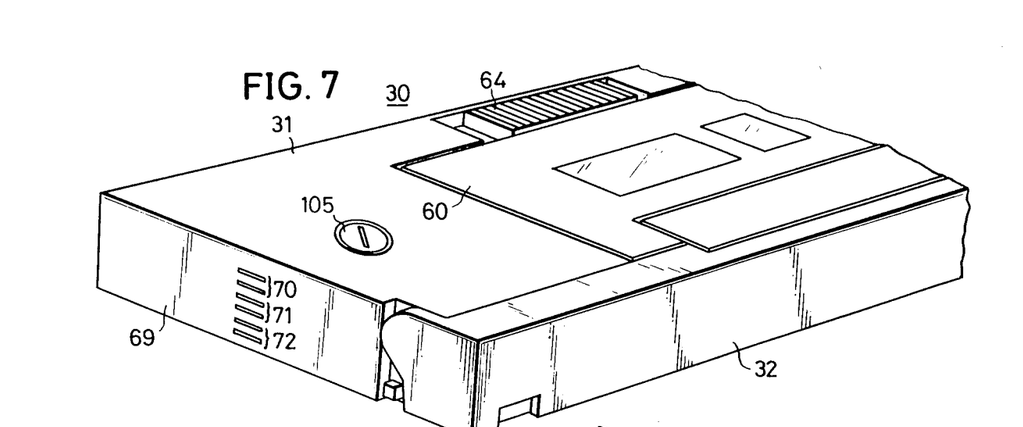
FIGS. 7 and 8 are perspective views, respectively showing the adapter shown in FIG. 4 from the right side thereof and from the left side thereof.
Figure 8:
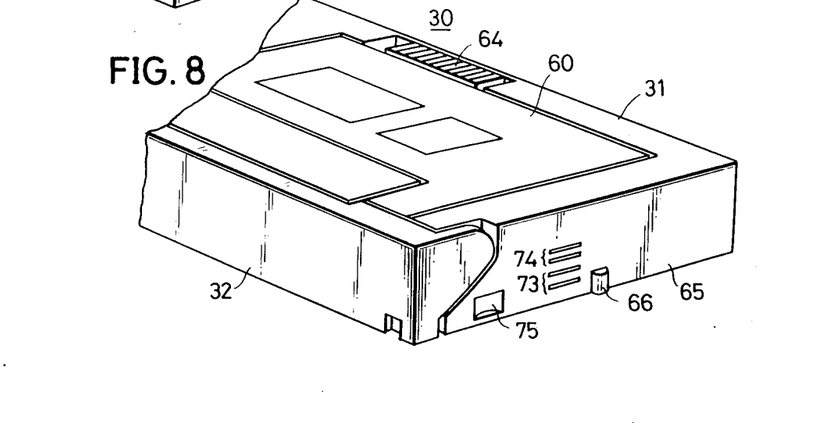

FIGS. 4, 7, and 8 show the adapter 30 for accommodating the miniature type tape cassette. This adapter 30 which is loaded into the apparatus 10, comprises an adapter case 31, a front lid 32, and an accommodating part 33 for accommodating the miniature type tape cassette. The adapter 30 has an external shape and form which are approximately the same as those of a standard type tape cassette. FIG. 5 shows a miniature type tape cassette 34 which is accommodated within the accommodating part 33 of the adapter 30. The miniature type tape cassette 34 is smaller than the standard type tape cassette, and comprises a cassette case 35 which accommodates a magnetic tape, and a lid 36 disposed at the front of the cassette case 35. Normally, the lid 36 is closed so as to protect the magnetic tape accommodated within the cassette case 35.

The adapter 30 is designed to perform a tape loading operation by use of a motor 37 which is built within the adapter 30. In other words, when the motor 37 rotates in a forward direction, the driving force of the motor 37 is transmitted to a gear 40 through a worm 38 and a gear system 39. Hence, the gear 40 rotates clockwise in FIG. 4 together with an arm 41 and a switching cam 42 which are integrally formed on the gear 40. A special chain 44 is taken up as the arm 41 rotates, and a loading arm 45 rotates clockwise about a pin 46 up to a position indicated by a two-dot chain line in FIG. 4. The rotation of the arm 45 is transmitted to a loading arm 51 through a bell crank lever 47, a link 48, a bell crank lever 49, and a link 50. As a result, the loading arm 51 rotates counterclockwise in FIG. 4 about a pin 52, up to a position indicated by a two-dot chain line in FIG. 4.

As the loading arms 45 and 51 rotate, poles 53 and 54 intercept and draw out a magnetic tape 55 from the miniature type tape cassette 34 which is accommodated within the accommodating part 33. By this tape loading operation within the adapter 30, a tape path 56 is formed at the front of the adapter 30. This tape path 56 corresponds to the tape path at the front of the standard type tape cassette.

On the other hand, when the motor 37 rotates in a reverse direction, each of the members described above operate in directions which are opposite to the operating directions at the time of the tape loading operation. Thus, the loading arm 45 rotates counterclockwise, and the loading arm 51 rotates clockwise in FIG. 4. Further, a take-up reel 58 within the miniature type tape cassette 34 rotates in a tape take-up direction due to the rotation of a gear 61. Therefore, a tape unloading operation is performed within the adapter 30, and the tape 55 forming the tape path 56 at the front of the adapter 30 is recovered within the miniature type tape cassette 34.

A locking member 59 which operates together with the link 48, locks the top cover 60 which covers the accommodating part 33 of the adapter 30, so that the top cover 60 does not open in a state where the tape 55 is drawn outside the miniature type tape cassette 34.

Figure 6:
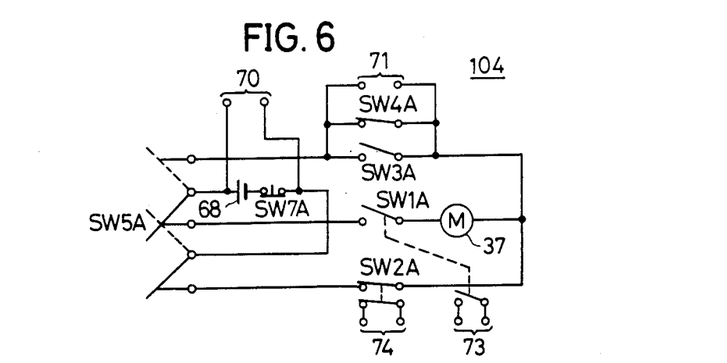
FIG. 6 is a circuit diagram showing connections between a motor within the adapter shown in FIG. 4 and a plurality of detecting switches.

A motor driving circuit 104 comprising the motor 37, a battery 68, and switches as shown in FIG. 6, is provided within the adapter 30. The switches which are provided within the adapter 30, are designated by a reference numeral with a subscript "A". A switch SW1A detects whether the miniature type tape cassette 34 is accommodated within the accommodating part 33 of the adapter 30, and this switch SW1A is closed by a lever 63 when the miniature type tape cassette 34 is accommodated within the accommodating part 33. A switch SW2A is closed when the top cover 60 is closed. A switch SW3A starts the tape unloading operation, and this switch SW3A is pushed and closed by a stopper 64a which is integrally formed on a sliding knob 64 when the knob 64 is slid in the direction of an arrow X1 up to a position where the knob 64 is locked. The knob 64 is locked at the slid and operated position by a locking member (not shown), and the switch SW3A is also kept in the closed state. A switch SW4A is a supplemental switch with respect to the switch SW3A, and closes when the loading arm 45 starts to rotate counterclockwise from the tape draw-out position indicated by the two-dot chain line in FIG. 4. The supplemental switch SW4A is coupled in parallel to the switch SW3A. As will be described later on in the specification, the supplemental switch SW4A closes after the tape unloading operation is started, so that a motor drive and control circuit remains inoperative even when the switch SW3A opens immediately before the tape unloading operation is completed. Concretely speaking, the supplemental switch SW4A is normally closed The supplemental switch SW4A is pushed and opened by the loading arm 45 when the loading arm 45 rotates up to the position where the tape draw-out operation is completed, and is closed when the loading arm 45 rotates counterclockwise and is released from the engagement with the loading arm 45. A switch SW5A detects whether the tape loading operation or the tape unloading operation is completed. When the tape unloading operation is completed, the switch SW5A is switched as indicated by a solid line in FIG. 6 by the switching cam 42 described before. The switch SW5A is switched as indicated by a phantom line in FIG. 6 by the switching cam 42, when the tape loading operation is completed. A switch SW6A detects whether the tape loading operation is completed, and is closed by the switching cam 42 when the tape loading operation is completed. A switch SW7A switches a power source, and is normally closed. The switch SW7A opens when the adapter 30 is inserted into the adapter housing 21 and a projection 66 shown in FIG. 8 which projects from a left wall 65 of the adapter case 31 is inserted within the adapter case 31 against a force exerted by a spring 67, so as to disconnect the battery 68 within the adapter 30 from the motor driving circuit 104. The battery 68 is used when the adapter 30 is to be operated before the adapter 30 is loaded into the apparatus 10.

A plurality of terminals are exposed at the right and left walls 65 and 69 of the adapter case 31, as shown in FIGS. 7 and 8. The terminals are arranged in the thickness (height) direction of the adapter case 31. As will be described later on in the specification, the terminals make contact with respective contact groups of the adapter housing 21 when the adapter 30 is inserted into the adapter housing 21. As shown in FIGS. 3 and 7, power source input terminals 70 which constitute an essential part of the present invention, input terminals 71 for a tape unloading start signal, and output terminals 72 for a tape loading completion detection signal, are arranged in this sequence from the top on the right wall 69 of the adapter case 31. The terminals 71 form a circuit which is coupled in parallel with the switch SW3A as shown in FIG. 6, when the adapter housing 21 returns to the position C as will be described later on in the specification. The terminals 72 are provided in relation to the switch SW6A, and a tape loading completion signal is produced through the terminals 72 when the switch SW6A is closed.

As shown in FIG. 8, output terminals 73 and 74 are provided on the left wall 65 of the adapter case 31. A signal which indicates that there is a miniature type tape cassette accommodated within the adapter 30, is produced through the output terminals 73 when the switch SW1A closes. A signal which indicates that the top cover 60 of the adapter 30 is closed, is produced through the output terminals 74 when the switch SW2A closes. A depression 75 for discriminating the adapter, is formed on the left wall 65.

Next, description will be given with respect to the operation of the apparatus 10 when the adapter 30 is used.

Figure 10:
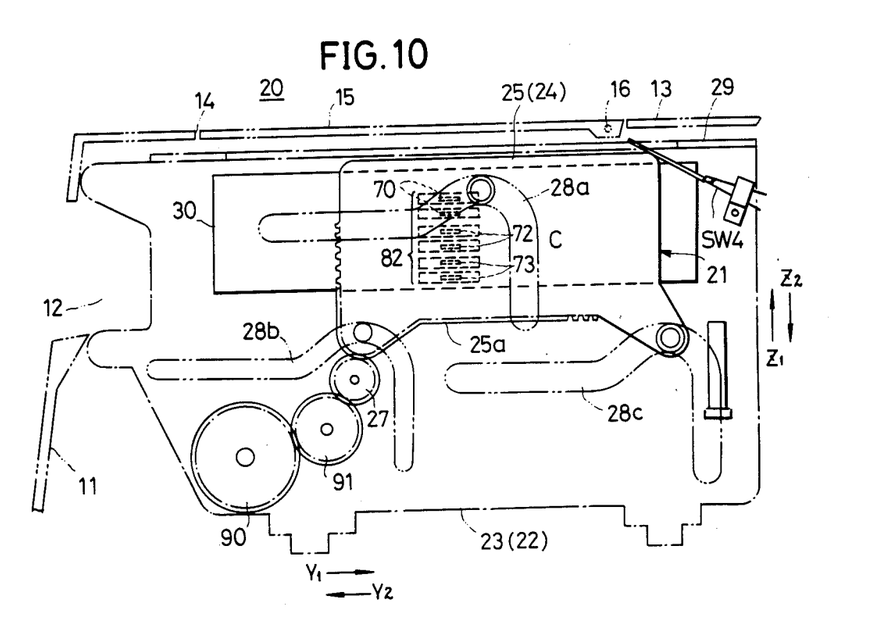

First, a power source switch 80 of the apparatus 10 is turned ON, and an empty adapter 30 which does not accommodate a miniature type tape cassette 34, is inserted through the inserting opening 12 of the apparatus 10. The empty adapter 30 is pushed in the direction of an arrow Y1, and is inserted into the adapter housing 21 up to a position indicated by a one-dot chain line in FIGS. 2 and 3. In this state, the terminals 71 through 73 and the terminals 74 and 75 on both sides of the adapter 30, make contact with contact groups 82 and 81 which are provided on the inner surfaces of the right and left side plates 25 and 24 of the housing 21. As a result, the adapter 30 and the apparatus 10 become electrically coupled with each other. As shown in FIG. 10, the terminals 70 make contact with the corresponding contact group 82, and the power source circuit 100 within the apparatus 100 becomes electrically coupled to the motor driving circuit 104 within the adapter 30. Further, as the adapter 30 is inserted into the inserting opening 12, the projection 66 is pushed by the side wall of the adapter housing 21. The projection 66 is thus pushed into the adapter case 31 as indicated by a two-dot chain line in FIG. 4, and the switch SW7A is opened to disconnect the battery 68 from the motor driving circuit 104. Accordingly, the motor 37 is thereafter driven by an output voltage of the power source supplying circuit 100, and the battery 68 is prevented from becoming overcharged by an output current of the power source supplying circuit 100.

In addition, the tip end of an adapter detecting lever 83 enters within the depression 75 described before, and the adapter detecting lever 83 is rotated counterclockwise by a torsion coil spring 84. Thus, an adapter detecting switch SW1 closes, and it is detected that the adapter 30 has been inserted into the adapter housing 21. Further, the lid 32 of the adapter 30 pushes slide plates 85 and 86 which are slidably provided on the bottom plate 26. As a result, the slide plates 85 and 86 slide slightly in the direction of the arrow Y1, and a rotary arm (not shown) rotates so as to close adapter insertion detecting switches SW2 and SW3 which are mounted on respective side plates 24 and 25.

Figure 9:
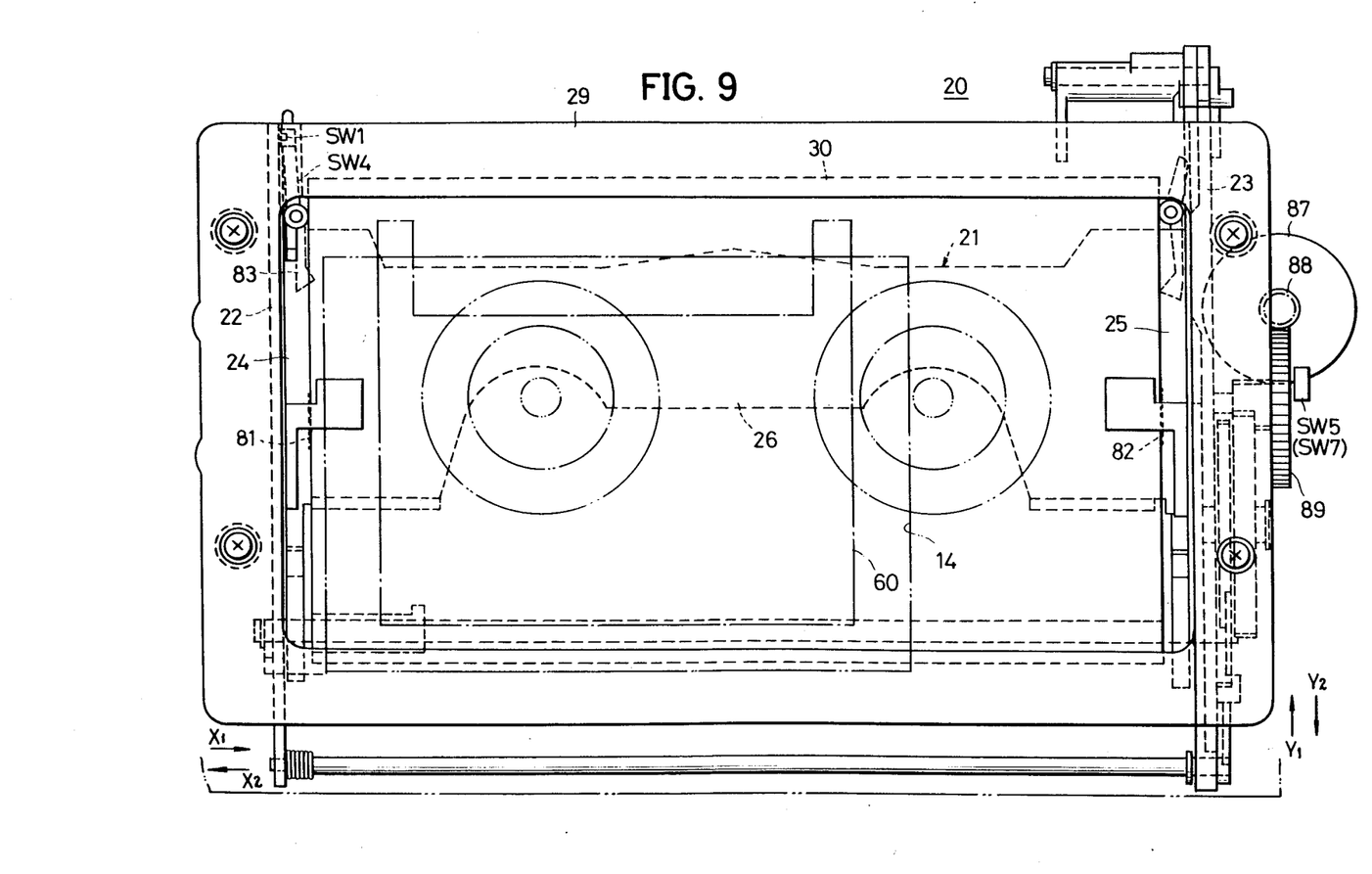
FIGS. 9 and 10 are a plan view and a side view, respectively showing an automatic adapter loading and unloading mechanism, in a state where an adapter housing assumes a position for accommodating and removing the miniature type tape cassette.

When the detecting switches SW2 and SW3 close, a motor 87 starts to rotate in the forward direction, and the driving force of the motor 87 is transmitted to the pinion 27, through a worm 88, a worm wheel 89, gears 90 and 91, and the like. Thus, the pinion 27 is rotated clockwise. As a result, the adapter housing 21 moves in the direction of the arrow Y1 together with the adapter 30 which is inserted into the adapter housing 21. The adapter housing 21 further moves obliquely upwards, and the adapter 30 is drawn into the apparatus 10. When the adapter housing 21 reaches the position C shown in FIGS. 9 and 10, the side plate 24 makes contact with a position detecting switch SW4 which is mounted obliquely to the support plate 22, and the switch SW4 is closed. The adapter housing 21 stops at the position C together with the adapter 30. The adapter housing 21 remains in the position C until a predetermined operation is performed.

Thereafter, the operator opens the cover 15 on the top plate 13 of the apparatus 10, up to a position where the cover 15 becomes vertical to the top plate 13. As a result, the opening 14 becomes exposed, and the top cover 60 of the adapter 30 is positioned immediately below the opening 14. Next, when the operator inserts his finger through the opening 14 and slides the knob 64 of the adapter 30 in the direction of the arrow X1, the top cover 60 is released from its locked state and opens. The top cover 60 rotates up to a position where the top cover 60 becomes substantially vertical, due to the action of the torsion coil spring 76. In this state, the miniature type tape cassette 34 is inserted through the opening 14, and is accommodated within the accommodating part 33 of the adapter 30.

After the miniature type tape cassette 34 is accommodated within the accommodating part 33, the top cover 60 is closed, and the cover 15 is closed subsequently.

The motor 37 is applied with the output voltage of the power source supplying circuit 100 of the apparatus 10, through the upper two contacts 82a of the contact group 82 and the terminals 70, and is driven by this output voltage. As described before, the tape loading operation is carried out within the adapter 30 responsive to the driving of the motor 37, and the tape path 56 is formed. When the tape loading operation is completed, the switch SW6A is closed, and the switch SW5A switches over as indicated by a phantom line in FIG. 6. The motor 37 stops rotating when the switch SW5A is switched over.

The tape loading operation within the adapter 30 in the state where the adapter 30 is loaded into the apparatus 10, is carried out by use of the output voltage of the power source supplying circuit 100 of the apparatus 10. Hence, it is possible to reduce the wear of the battery 68. Further, even when the battery 68 has worn out and died, the tape loading operation can still be carried out within the adapter 30 which is loaded into the apparatus 10.

In addition, when the switch SW6A is closed, the tape loading completion detection signal is produced through the terminals 72. This tape loading completion detection signal is applied to the apparatus 10 through two lower contacts 82b of the contact group 82, to drive the motor 87 again. As a result, the adapter housing 21 moves downwardly in the direction of the arrow Z2 to the position B. In this state, the adapter 30 is loaded into the apparatus 10 as shown in FIG. 2 and as indicated by the two-dot chain line in FIG. 3, and the motor 87 is stopped.

When a play button 92 is manipulated in this state, the tape 55 is drawn out of the adapter 30 and is loaded into a predetermined tape path within the apparatus 10. In this predetermined tape path, the tape 55 is wrapped around the peripheral surface of a drum. The reproduction is carried out in a state where the tape 55 moves in this predetermined tape path. The recording is carried out similarly, when the play button 92 and a recording button 93 are manipulated simultaneously.

A first eject button 94 is manipulated when the tape cassette 34 which is being played is to be changed to another miniature type tape cassette. The motor 87 rotates in the reverse direction responsive to the manipulation of the first eject button 94, and the adapter housing 21 moves upwardly in the direction of the arrow Z1 to the position C together with the adapter 30. The switch SW4 closes again when the adapter housing 21 reaches the position C, and the motor 87 stops rotating. A circuit parallel to the switch SW3A is formed through the circuit within the apparatus 10, two center contacts 82c of the contact group 82, and the terminals 71, and the motor 37 is rotated in the reverse direction.

Accordingly, the adapter 30 stops at the position C, and the tape unloading operation is automatically carried out within the adapter 30.

As the tape unloading operation progresses to the final stage of the operation, the locking with respect to the top cover 60 is cancelled. The top cover 60 is thus opened by the action of a spring 77 so that the top cover 60 assumes a vertical state. Further, the cover 15 is pushed and automatically opened by the top cover 60.

In this state, the operator removes the tape cassette 34 from the accommodating part 33 through the opening 14. Then, a different miniature type tape cassette is inserted into the accommodating part 33, and the top cover 60 is closed. As in the case described before, the motor 87 rotates in the forward direction, the adapter housing 21 moves to the position B, and the adapter 30 is loaded into the apparatus 10.

The removal and insertion of the miniature type tape cassette 34 from and into the accommodating part 33 of the adapter 30, can be carried out through the opening 14, in the state where the adapter 30 is inside the apparatus 10. Hence, it is unnecessary to extract the adapter 30 outside the apparatus 10 every time the miniature type tape cassette is to be changed, and the operation of changing the miniature type tape cassette becomes conveniently simple for the operator. Moreover, it is possible to reduce the time it takes for the different miniature type tape cassette to be played from the time when the playing with respect to the previous miniature type tape cassette has been completed. In other words, it is possible to reduce the duration in which the recording or reproduction is interrupted while the miniature type tape cassette is being changed.

When the tape cassette 34 is removed from the adapter 30 so as to empty the adapter 30 and the top cover 60 is closed in the state where the adapter housing 21 assumes the position C, signals are produced through the terminals 73 and 74. These signals are applied to the apparatus 10 through the contact group 81. As a result, the motor 87 is rotated in the reverse direction, and the adapter housing 21 moves in the direction of the arrow Y2. The adapter housing 21 returns to the position A, and the empty adapter 30 is automatically ejected from the apparatus 10.

In a case where a second eject button 95 is manipulated, the adapter housing 21 does not stop at the position C. In other words, the adapter housing 21 moves to the position A from the position B, so as to eject the adapter 30 through the inserting opening 12. When the adapter housing 21 returns to the position A, the motor 87 automatically stops rotating.

When the tape unloading operation is to be carried out within the adapter 30 in a state where the adapter 30 is extracted outside the apparatus 10, the sliding knob 64 is manipulated in the direction of the arrow X1 up to the locking position. The switch SW3A is closed responsive to this manipulation of the sliding knob 64. In the state where the adapter 30 is extracted outside the apparatus 10, the projection 66 projects from the side wall of the adapter 30, and the switch SW7A is closed. Thus, the battery 68 is coupled to the motor driving circuit 104. Hence, when the switch SW3A is closed, the motor 37 becomes coupled to the battery 68, and starts to rotate in the reverse direction so as to carry out the tape unloading operation. In the final stage of the tape unloading operation, the locking with respect to the top cover 60 is cancelled and the top cover 60 opens. The switch SW3A is opened responsive to this unlocking of the top cover 60, but the switch SW4A is still closed in this state. For this reason, the motor 37 will not stop rotating, and the tape unloading operation will be carried out until the operation is completed. The switch SW5A is switched over when the tape unloading operation is completed, so as to stop the rotation of the motor 37.

In the adapter 30 described heretofore, when the tape cassette 34 is inserted into the adapter 30 which is outside the apparatus 10 and the top cover 60 is then closed, the motor 37 is rotated by the battery 68 so as to carry out the tape loading operation. The switch SW6A is closed in the adapter 30 which has the tape path 56 formed at the front thereof, and a signal is produced through the terminals 72. For this reason, when the adapter 30 having the tape path 56 formed at the front thereof is inserted into the apparatus 10 through the inserting opening 12, the adapter housing 21 will not stop at the position C as in the case where the empty adapter is inserted. The adapter 30 moves to the position B without stopping at the position C, and is loaded into the apparatus 10.

When the battery 68 has been removed from the adapter 30, the tape loading operation will not be carried out within the adapter even when the tape cassette 34 is inserted into the accommodating part 33. When this adapter 30 which simply accommodates the tape cassette 34 and does not have the tape path 56 is inserted into the adapter housing 21 through the inserting opening 12, the motor 87 rotates in the forward direction and the adapter housing 21 moves to the position C together with the adapter 30. In addition, when the adapter 30 is inserted into the adapter housing 21, the output voltage of the power source circuit 100 of the apparatus 10 is applied to the adapter through the terminals 70. As a result, the motor 37 is rotated by this output voltage of the power source circuit 100, and the tape loading operation is carried out within the adapter 30. In other words, the adapter 30 moves in the direction of the arrow Y1 while the tape loading operation is carried out therein. The tape loading operation within the adapter 30 is completed before the adapter housing 21 reaches the position C, and the adapter housing 21 moves to the position B without stopping at the position C. The adapter 30 is hence loaded into the apparatus 10.

In a case where a standard type tape cassette is inserted through the inserting opening 12, the adapter detecting lever 83 is pushed and rotated by the side surface of the standard type tape cassette, and the switch SW1 is opened. Accordingly, unlike the case where the adapter 30 is inserted into the adapter housing 21, the adapter housing 21 moves to the position B without stopping at the position C and the standard type tape cassette is loaded into the apparatus 10. When the eject operation is carried out with respect to the standard type tape cassette, the adapter housing 21 returns directly to the position A, so as to eject the standard type tape cassette out of the apparatus 10.

The adapter 30 is designed so that the tape loading and tape unloading operations within the adapter 30 can be carried out by manually rotating a knob 105 which is located on the top of the adapter case 31. The knob 105 is disposed above the gear 40. In order to ensure smooth manual tape loading and tape unloading operations within the adapter 30, the gears constituting the gear system 39 are respectively provided with a slip clutch.

When loading the existing adapter which has no contact group 82 into the apparatus 10, the tape loading operation within the adapter is carried out before the adapter is loaded into the apparatus 10. Similarly, when unloading such an adapter from the apparatus 10, the tape unloading operation within the adapter is carried out after the adapter is unloaded from the apparatus 10. Such tape loading and tape unloading operations may be carried out automatically by use of a motor and battery within the adapter, or may be carried out manually as described before.

Further, the present invention is not limited to these embodiments, but various variations and modifications may be made without departing from the scope of the present invention.

What is claimed is:

1. An adapter for a miniature type tape cassette, said miniature type tape cassette having a size smaller than a standard type tape cassette which is used with a standard type recording and/or reproducing apparatus which is primarily designed to play the standard type tape cassette, said miniature type tape cassette being playable by itself on a recording and/or reproducing apparatus of a type different from the stand type recording and/or reproducing apparatus, said standard type recording and/or reproducing apparatus having a first electrical circuit comprising a power source circuit for operating said adapter and a contact disposed at a position exposed in a space into which said adapter is inserted, said contact being an output terminal of said electrical circuit, said adapter comprising:

an adapter case having an external form and size substantially the same as the external form and size of said standard type tape cassette;

an accommodating part for accommodating said miniature type tape cassette;

a tape draw-out mechanism provided within said adapter case for drawing a tape out of said miniature type tape cassette which is accommodated within said accommodating part, and for forming a tape path within said adapter case;

a second electrical circuit located within said adapter case, said second electrical circuit comprising a motor driving circuit including a motor and a battery for driving said motor;

a gear mechanism provided within said adapter case and driven by said motor for operating said tape draw-out mechanism;

terminal means coupled to said second electrical circuit and exposed at a surface of said adapter case, said terminal means making contact with said contact of said standard type recording and/or reproducing apparatus when said adapter is inserted into said standard type recording and/or reproducing apparatus to electrically couple said second electrical circuit to said first electrical circuit so that said motor driving circuit is electrically coupled to said power source circuit through said contact and said terminal means; and an electrically disconnecting mechanism provided within said adapter case for electrically disconnecting said battery from said motor driving circuit automatically when said adapter is inserted into said standard type recording and/or reproducing apparatus.

2. An adapter as claimed in claim 1 in which said terminal means are located on a side wall of said adapter case.

3. An adapter as claimed in claim 1 in which said electrically disconnecting mechanism comprises a normally closed switch directly coupled to said battery for normally coupling said battery to said motor, and a projection projecting from a side wall of said adapter case, said projection being pushed into said adapter case by a part of said standard type recording and/or reproducing apparatus when said adapter is inserted into said standard type recording and/or reproducing apparatus to automatically open said switch so that said motor is electrically disconnected from said battery and is coupled to said power source circuit.

* * * * *

UNITED STATES PATENT AND TRADEMARK OFFICE
CERTIFICATE OF CORRECTION

PATENT NO. : 4,622,605

DATED : November 11, 1986

INVENTOR(S) : TSURUOKA, Mitsuharu et al

It is certified that error appears in the above-identified patent and that said Letters Patent is hereby corrected as shown below:

Column 11, line 33  please delete "stand" and replace therefor --standard--.

Signed and Sealed this

Seventeenth Day of February, 1987

Attest:

DONALD J. QUIGG

Attesting Officer   Commissioner of Patents and Trademarks